3,625,645
PROCESS FOR THE RECOVERY OF VANADIUM FROM RAW TITANIUM CHLORIDE
Francesco Ferrero and Giuseppe Sironi, Novara, and Angelo Garberi, Cilavegna, Italy, assignors to Montecatini Edison S.p.A., Milan, Italy
Filed May 16, 1969, Ser. No. 825,158
Claims priority, application Italy, May 20, 1968, 16,706A/68
Int. Cl. C22b 59/00; C01g 31/00
U.S. Cl. 23—17                              8 Claims

ABSTRACT OF THE DISCLOSURE

A process is disclosed for recovering vanadium from solid $TiCl_4$-free residues obtained in the purification of raw $TiCl_4$ with $H_2S$, wherein the solid residues are treated with oxygen or an oxygen-containing gas at temperatures between 150° and 200° C., thereby obtaining a $VOCl_3$-containing gas from which the $VOCl_3$ is separated in a practically pure state by rectification. The solid $TiCl_4$-free residues are obtained from the purification sludges of the liquid raw $TiCl_4$ by drying same at temperatures of 150°–180° C., in a stream of inert gas, preferably nitrogen.

---

Figure 1:
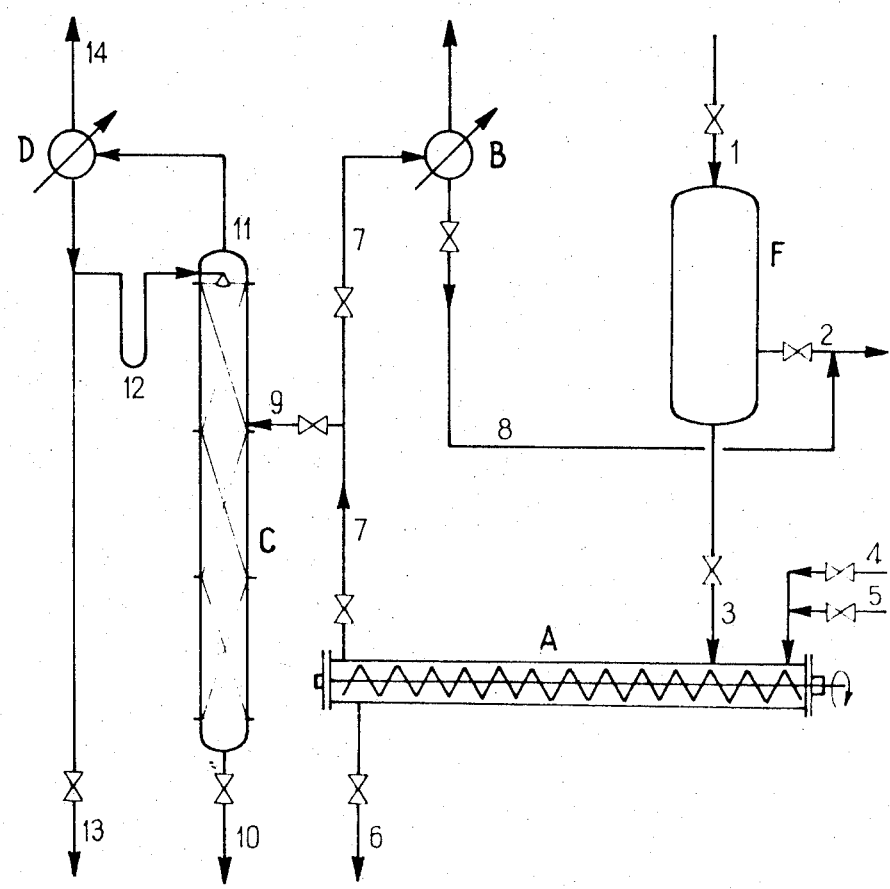

The present invention relates to a process for the recovery of vanadium from raw titanium chloride. More particularly, this invention relates to a process for recovering vanadium, in the form of practically pure $VOCl_3$, from the residues of the purification of $TiCl_4$ from vanadium compound with hydrogen sulphide.

As is already known, the raw titanium tetrachloride obtained by chlorination of mineral rutile or other titaniferous ores (ilmenites, leucoxenes, etc.) is a yellow-orange liquid containing as main impurities vanadium chlorides and oxychlorides and silicon, iron and aluminum chlorides; furthermore, it contains dissolved therein a number of gases such as $CO$, $CO_2$, $COCl_2$, $HCl$, $Cl_2$. Hereinafter these gases will be referred to as "uncondensable gases."

Rectification allows the separation of the uncondensable gases and the silicon tetrachloride as head products. The Fe, Al, Cr. etc. impurities are eliminated as high-boiling tail products. The central fraction of the rectified product is a clear, yellow-orange colored liquid consisting of $TiCl_4$ and vanadium compounds.

The vanadium present in the raw titanium tetrachloride in the form of soluble chloride and/or oxychloride is only difficultly separable by rectification from the $TiCl_4$, both because of its low concentration in the latter, as well as for the closeness of the respective boiling temperatures. The elimination of the vanadium is, however, indispensable for obtaining titanium tetrachloride sufficiently pure for producing $TiO_2$ pigment or metal titanium.

The known processes for the separation of the vanadium from raw titanium tetrachloride consist essentially of a chemical purification of the latter by the use of various agents such as hydrogen sulphide, oleic acid, mineral oils, xanthic esters, soaps, etc.

Treatment with these substances causes the vanadium to be precipitated in the form of insoluble and non-volatile compounds, whereupon it is then possible to achieve the desired Ti-V separation by simple distillation of the $TiCl_4$.

Among the various purifying agents, hydrogen sulphide is one of the most frequently used, both for its tested effectiveness as well as for the ease of dosing and manipulation.

The prior art purification processes with $H_2S$ consist substantially in treating the raw $TiCl_4$ in liquid phase with a sufficient amount of gaseous $H_2S$ at room temperature, thereby obtaining slurries relatively fluid and decantable in comparison with those obtained with the other above-mentioned agents. Although these slurries containing in suspension the solid reaction products may be distilled directly, it is nevertheless preferable to first subject them to a decanting process and then to carry out the distillation or rectification on the clarified liquid in order to avoid serious drawbacks, due to the accumulation of the solid compounds in the boiler or pot of the distillation apparatus.

The thickened sludges, since they contain a considerable amount of $TiCl_4$ (about 80% by weight), must obviously be subjected to a process of vaporization in order to recover the titanium tetrachloride contained in them, thereby obtaining a dry $TiCl_4$-free product.

According to another process described and claimed in Serial No. 822,110, filed May 1969, this dry product containing besides the vanadium compounds also the other impurities of the raw $TiCl_4$, and which is free of $TiCl_4$, may be obtained directly without having to pass through the above-described wet steps, by carrying out the purification of the raw $TiCl_4$ by means of $H_2S$ in gaseous phase at a temperature between 130° and 180° C. By this process, in fact, the vanadium impurities separate as solid products at the same time as the solids dragged downstream of the chlorination reactor (titaniferous ore, coke, etc.) and with the volatile chlorides which desublimate or condense ($FeCl_2$, $FeCl_3$, $ZrCl_4$, etc.).

This dry product, however obtained, contains prevailingly in the form of $VOCl_3$ and $VOCl_2$, practically all the vanadium which was present in the starting raw substance and may therefore be conveniently subjected to a process for the recovery of the vanadium itself.

Thus, the object of this invention is to provide a process for the recovery, in the form of a practically pure compound, the vanadium contained in the above-mentioned dry $TiCl_4$-free product obtained as a residue in the purification of the $TiCl_4$.

Another object of this invention is to recover the vanadium in the form of a valuable product such as $VOCl_3$ which, considering its substantial purity, may be used directly, for instance, as a component of polymerization catalysts for olefines.

Still another object of this invention is to convert the dry solid coming from the vaporization of $TiCl_4$, and containing hydrolizable products, into an inert mass which will not produce smoke when brought into contact with moisture, because it contains no more hydrolizable chlorides and, therefore, may be freely discharged into the air, thereby saving the cost of its elimination.

A still further object is to recover the vanadium by a simple and cheap system which may be directly inserted into an existing plant for the production of $TiCl_4$.

All these and still other objects are attained by the process of this invention, which consists in treating the solid $TiCl_4$-free residues, as obtained by the purification of the raw $TiCl_4$ which $H_2S$ with oxygen or gases containing oxygen at temperatures of from 150° to 200° C., thereby obtaining a gas containing $VOCl_3$, and from which the $VOCl_3$ may be separated in a practically pure state by rectification.

If the antecedent purification of the $TiCl_4$ with hydrogen sulphide has been carried out in the liquid phase, after the settling or filtering of the slurry one obtains a thickened sludge which is fed into a suitable vaporizer (for instance, of the screw type) where the evaporation of the $TiCl_4$ takes place in a current of a dry inert gas (for instance nitrogen, $CO_2$, CO, argon, helium) at temperatures between 150° and 180° C.

The $TiCl_4$-vapors, free of vanadium but contaminated by small amounts of silicon tetrachloride, are sent either directly or after condensing, to a fractioning column from which the uncondensable gases and the silicon tetrachloride (B.P. 57.6° C.) are separated as a head product, while the tail product (B.P., 136.4° C.) constitutes the pure titanium tetrachloride which may be used directly for the desired industrial purposes.

The drying system for the thickened sludges may also include other apparatuses different from the screw-type, such as for instance heated mechanical mixers, rotary hearth furnaces, roller or rotary dryers and the like, for facilitating the separation of the gases and vapors from the solid particles and allowing the discharging of the latter.

If the solids containing the vanadium are already free of $TiCl_4$, one may then proceed directly to the treatment with the oxidizing gas.

The dry solid product contains usually from about 5% to 20% by weight of vanadium, calculated as metallic vanadium.

The treatment of this dry solid at 150–200° C. with oxidizing gases (oxygen, air or oxygen-enriched air in any ratio) may be carried out in the same apparatus as is used for the recovery of the $TiCl_4$ from the sludges, thus involving a discontinuous or intermittent process. Alternatively one may use apparatuses of the same type (that is, the above-mentioned screw-type mixers, rotary furnaces, etc.) or apparatuses of different type (for instance, of the fluid-bed type). Preferred are apparatuses provided with means for indirect heating. When not using the same apparatus as is used for the recovery of the $TiCl_4$ from the sludges, it is feasible to carry out the process in a continuous manner.

The amount of oxidizing gas used in the oxidation treatment amounts to 1 to 2 kilos of oxygen for each kg. of vanadium to be recovered. The gases produced during the oxidation consist of $VOCl_3$, $TiCl_4$ (formed by oxidation of the $TiCl_3$ present in the solid before the oxidation), and $SO_2$ (formed by oxidation of the sulphur introduced as $H_2S$).

These gases contain (respectively) 2.5–1.5 kg. of $VOCl_3$ per cubic meter of gaseous mixture when using oxygen, and 1.3–0.5 kg. of $VOCl_3$ when using air.

The contact time of the oxidizing gas in the apparatus for the oxidation of the solids must be sufficiently long to ensure the most complete as possible transformation of the vanadium compounds into $VOCl_3$; this time depends on the partial pressure of the oxygen, on the temperature, on the kind of equipment employed, and on the contact surface between the solid and the gas.

The vapors produced during the oxidation reaction may be fractionated directly or they may be condensed at temperatures between 0° C. and −30° C., thereby obtaining a dark red liquid essentially consisting of $VOCl_3$ and a little $TiCl_4$. This product, rectified in a column of 10 to 30 plates, yields a head fraction boiling between 125° and 127° C. which is a red-orange colored product consisting essentially of pure $VOCl_3$, and a tail product which boils above 127° C. and which consists of $VOCl_3$ and $TiCl_4$. This latter fraction is preferably recycled back into the system involving the step of purification with $H_2S$.

The following examples (and corresponding figures) are given in order to still better illustrate the inventive idea of this invention:

EXAMPLE 1

With reference to the plant schematically represented in the accompanying FIG. 1, 100 kg. of liquid raw $TiCl_4$ (containing 0.17% by weight of vanadium expressed as metallic vanadium), after having been treated while stirring and at room temperature with 0.2 kg. of $H_2S$ in 15 minutes, give place to a slurry which, de-gassed with a current of dry nitrogen (600 liters) in 30 minutes while stirring, is then discharged via line 1 into settling tank F, where it is left to settle for 2 hours.

In this way there were obtained 93.2 kg. of clarified $TiCl_4$ (which goes to a rectification step via line 2) and 6.80 kg. of thickened material (containing 85% by weight of $TiCl_4$) which is conveyed through line 3 into the screw evaporator A. Here, with the screw at rest, the thickened material is dried for 4 hours at 160° C. with a stream of dry nitrogen (65 liters/hr.) entering from line 4. The $TiCl_4$-vapors (5.8 kg.) leave through line 7, are condensed in B and ,by means of line 8, are re-united with the clarified $TiCl_4$ leaving F on its way to rectification via line 2.

In evaporator A remain 0.99 kg. of a solid showing the following composition in percent by weight:

V=17.2%; Ti=13.8%; Cl=46.0%; elementary S= 10.3%; combined S=3.2%; Fe+Al<1%.

An oxygen stream (60 liters/hr.) is passed through the solid product remaining in A for a period of 3 hours. The oxygen flows in through line 5 at 170°–200° C., while the screw is at rest. The vapors leaving A are thereupon conveyed directly through 9 into rectification column C, which has 16 plates and from which, by operating with a reflux of 10:1, there are obtained (through 11–D–12) 0.18 kg. of gaseous $SO_2$ via line 14, and 0.47 kg. of head products via outlet 13 (B.P. 125°–127° C.; strength in $VOCl_3$>98%; the residue being substantially $TiCl_4$), and 0.21 kg. of tail product from the rectification column via line 10 (B.P. 127°–130° C.; having 70% of $TiCl_4$ and 30% of $VOCl_3$). The tail product from line 10 is recycled back into the $H_2S$ treatment system.

The exhausted solid (0.20 kg.) is freely discharged into the air from A through 6, by putting the screw into motion. This solid contains predominantly $TiO_2$ and titanium oxychlorides. The vanadium recovered with this dry solid amounts to 0.016 kg. from which one calculates a recovery of 90.6%.

EXAMPLE 2

Figure 2:
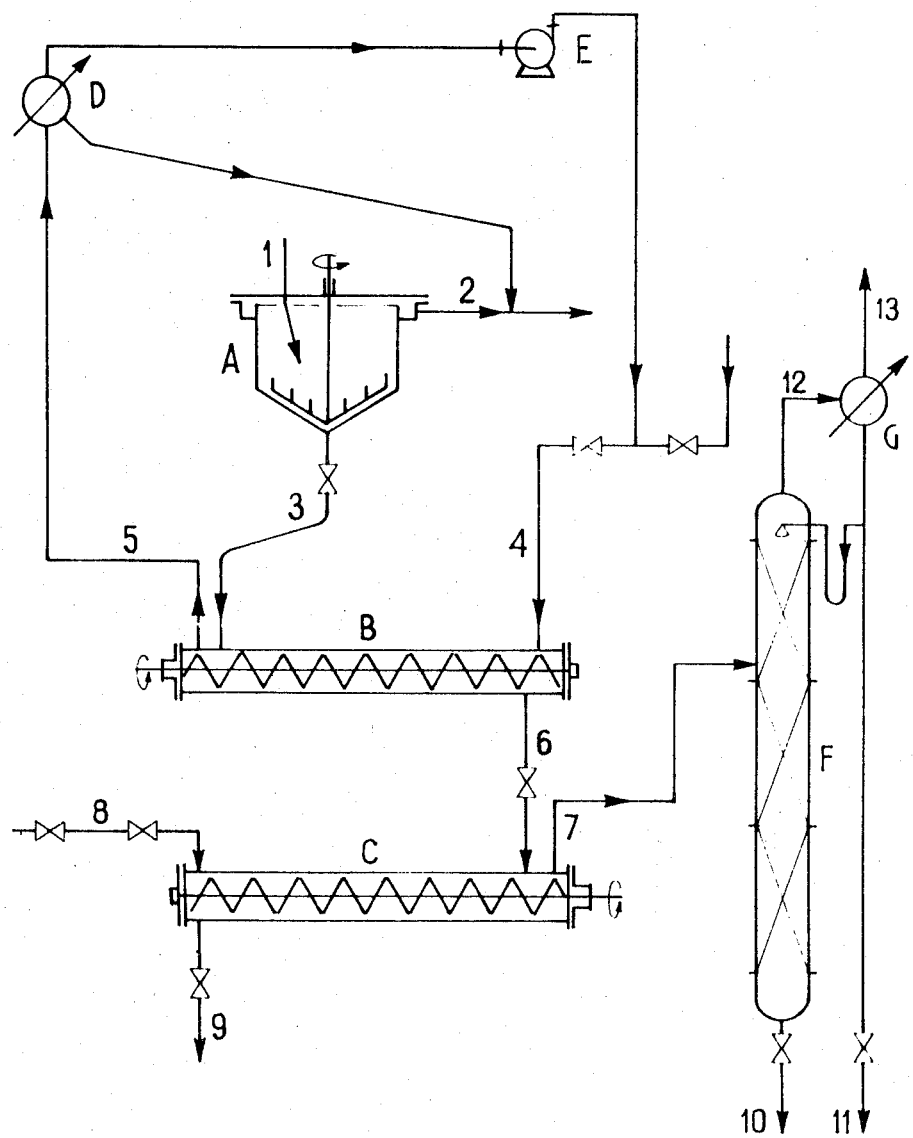

With reference to the plant schematically illustrated in the accompanying FIG. 2, 100 kg./hr. of slurry (0.17% by weight of vanadium) coming from the treatment of $TiCl_4$ with $H_2S$ are continuously fed through 1 into the DORR decanter or classifier A. From A 93 kg./hr. of clarified $TiCl_4$ are withdrawn via line 2. This is then rectified. 7 kg./hr. of thickened slurries are discharged continuously via line 3 into the screw-evaporator B, heated at 170° C., where they are heated with 200 liters/hr. of dry nitrogen introduced via line 4.

6.0 kg./hr. of $TiCl_4$-vapors are removed from B via line 5 and then condensed in D, the condensate being added to the clarified product leaving the system via line 2. The nitrogen flowing out of condenser D is then re-cycled by means of the recycling pump E. Both screws, B and C, are kept in motion by carrying out the two treatments continuously. From screw B 0.99 kg./hr. of dry solids are discharged via line 6 into screw mixer C kept at a temperature of 160° C., the dry solids meeting in their path of flow a counter-current stream of air (800 liters/hr.) fed in via line 8.

The vapors coming from line 7 are fractioned in F (a column with 16 plates, operating with a reflux of 10:1) thereby obtaining (respectively) through 10 and condenser G, 0.18 kg./hr. of gaseous $SO_2$ in 13, and 0.43 kg./hr. of head products in 11) B.P. 125°–127° C.; contents in $NOCl_3$>98%, the residue consisting substantially of $TiCl_4$).

From the bottom of the column F, there are discharged 0.24 kg./hr. of tail product (32% of $VOCl_3$+68% $TiCl_4$) via outlet 10. This is recycled back into the $H_2S$ purification system.

0.22 kg./hr. of exhausted solid material containing essentially $TiO_2$, titanium oxychlorides and a little vanadium are discharged from C via outlet 9. The vanadium removed with the dry solid amounts to 0.022 kg./hr. Thus, the recovery of the vanadium equals 87%.

What is claimed is:

1. A process for recovernig vanadium from solid $TiCl_4$-free residues obtained in the purification of raw $TiCl_4$ with $H_2S$, wherein said solid residues are treated with oxygen or an oxygen-containing gas in an amount from 1 to 2 kg. of oxygen for each kg. of vanadium present in said solid residues, at temperatures between 150 and 200° C., thereby obtaining a $VOCl_3$-containing gas, and thereafter separating from said gas the $VOCl_3$ in a practically pure state by rectification.

2. A process according to claim 1, wherein the solid $TiCl_4$-free residues are obtained from the purification sludges of liquid raw $TiCl_4$, by drying same at temperatures from 150° to 180° C. in a stream of an inert gas.

3. A process according to claim 2, wherein the inert gas is nitrogen.

4. A process according to claim 1, wherein air is used as the oxidizing gas.

5. A process according to claim 1, wherein the raw $VOCl_3$ is rectified in order to yield a purified $VOCl_3$ with a content of more than 98% in the head and a mixture of $VOCl_3$ and $TiCl_4$ in the tail.

6. A process according to claim 5, wherein the tail product comprising said mixture of $VOCl_3$ and $TiCl_4$ is recycled to the $H_2S$ purification stage.

7. A process according to claim 1, wherein the treatment with said oxygen or oxygen-containing gas is effected in indirectly heated apparatuses which readily allow the separation of the solids from vapors.

8. A process according to claim 7, wherein the apparatus includes a screw evaporator, a rotary furnace or a fluid-bed reactor.

References Cited

UNITED STATES PATENTS

| | | | |
|---|---|---|---|
| 2,230,538 | 2/1941 | Jenness et al. | 23—87 TP |
| 2,289,328 | 7/1942 | Pechukas | 23—87 TP |
| 2,754,255 | 7/1956 | Stambaugh | 23—87 TP |
| 2,836,547 | 5/1958 | Stoddard et al. | 23—87 TP |
| 2,958,574 | 11/1960 | Hansley et al. | 23—87 TP |
| 3,389,957 | 6/1968 | Olds et al. | 23—16 |

OTHER REFERENCES

Derwent Belgian Patents Report, vol. 74 B, April 28, 1961, page A29.

HERBERT T. CARTER, Primary Examiner

U.S. Cl. X.R.

23—21, 85, 87 TP, 19 V